United States Patent
Van Hardeveld et al.

(10) Patent No.: US 7,087,191 B2
(45) Date of Patent: Aug. 8, 2006

(54) SHELL METAL CATALYST AND A PRECURSOR THEREOF, A PROCESS FOR THEIR PREPARATION AND THE USE OF THE CATALYST

(75) Inventors: Robert Martijn Van Hardeveld, CM Amsterdam (NL); Carolus Matthias Anna Maria Mesters, CM Amsterdam (NL); Gerardus Petrus Lambertus Niesen, CM Amsterdam (NL)

(73) Assignee: Shell Oil Company, Houston, TX (US)

( * ) Notice: Subject to any disclaimer, the term of this patent is extended or adjusted under 35 U.S.C. 154(b) by 200 days.

(21) Appl. No.: 10/333,889

(22) PCT Filed: Jul. 11, 2001

(86) PCT No.: PCT/EP01/08021

§ 371 (c)(1),
(2), (4) Date: Jan. 24, 2003

(87) PCT Pub. No.: WO02/07882

PCT Pub. Date: Jan. 31, 2002

(65) Prior Publication Data

US 2003/0181535 A1 Sep. 25, 2003

(30) Foreign Application Priority Data

Jul. 24, 2000 (EP) .................................. 00306272

(51) Int. Cl.
*B01J 23/00* (2006.01)
*C01C 1/02* (2006.01)
*C10K 1/02* (2006.01)

(52) U.S. Cl. ...................... 252/373; 502/260; 502/326

(58) Field of Classification Search ................ 502/260, 502/261, 326, 349, 350; 252/373
See application file for complete search history.

(56) References Cited

U.S. PATENT DOCUMENTS

| | | | |
|---|---|---|---|
| 5,200,382 A * | 4/1993 | Cody et al. ................. 502/204 |
| 5,516,740 A * | 5/1996 | Cody et al. ................. 502/204 |
| 5,545,674 A | 8/1996 | Behrmann et al. |
| 5,935,889 A * | 8/1999 | Murrell et al. ................. 502/9 |
| 5,939,350 A * | 8/1999 | Singleton et al. ........... 502/230 |
| 6,117,814 A * | 9/2000 | Plecha et al. ................ 502/325 |
| 6,121,191 A * | 9/2000 | Komatsu et al. ............ 502/330 |
| 6,177,381 B1 * | 1/2001 | Jensen et al. ............... 502/325 |
| 6,268,522 B1 * | 7/2001 | Hagemeyer et al. ........ 560/245 |
| 6,365,545 B1 * | 4/2002 | Komatsu et al. ............ 502/326 |
| 6,534,437 B1 * | 3/2003 | Eijsbouts et al. ........... 502/313 |
| 6,573,213 B1 * | 6/2003 | Ostgard et al. ............. 502/301 |
| 6,603,038 B1 * | 8/2003 | Hagemeyer et al. ...... 560/241.1 |
| 6,710,003 B1 * | 3/2004 | Jan et al. ...................... 502/60 |
| 6,818,254 B1 * | 11/2004 | Hoke et al. ................. 427/429 |

FOREIGN PATENT DOCUMENTS

| | | |
|---|---|---|
| EP | 0 071 770 | 2/1983 |
| EP | 0 167 215 | 1/1986 |
| EP | 0 168 894 | 1/1986 |
| EP | 0 178 008 | 4/1986 |
| EP | 0 363 537 | 4/1990 |
| EP | 0 398 420 | 11/1990 |
| EP | 0 498 976 | 8/2002 |
| WO | 97/17137 | 5/1997 |
| WO | 99/34917 | 7/1999 |
| WO | 00/29108 | 5/2000 |

\* cited by examiner

*Primary Examiner*—Cam N. Nguyen

(57) ABSTRACT

A process for preparing a shell metal catalyst or a precursor of a shell metal catalyst which process includes the steps of: applying a slurry having a diluent; a catalytically active metal or a precursor compound thereof; and optionally a refractory oxide; designated hereinafter as "first refractory oxide" of an element having an atomic number of at least 20 or a precursor of the first refractory oxide; onto the surface of particles of a core carrier; forming a wet coating; and removing at least a part of the diluent from the wet coating; wherein the slurry has at least 5% w of the catalytically active metal or the precursor compound thereof; calculated on the weight of the metal relative to the weight of calcinations residue which can be formed from the slurry by drying the slurry and calcining. The invention also relates to a shell metal catalyst or a precursor of a shell metal catalyst which is obtainable by the process; and the use of the shell metal catalyst in a chemical conversion process. The invention also relates to a process for producing hydrocarbons; which process involves contacting a mixture of carbon monoxide and hydrogen with a shell metal catalyst, wherein the catalytically active metal is a Group VIII metal which is present at least partly in metallic form.

12 Claims, No Drawings

SHELL METAL CATALYST AND A PRECURSOR THEREOF, A PROCESS FOR THEIR PREPARATION AND THE USE OF THE CATALYST

FIELD OF THE INVENTION

The present invention relates to a shell metal catalyst and a precursor of the shell metal catalyst and to a process for their preparation. Further, the invention relates to a use of the shell metal catalyst, in particular in a process for the preparation of hydrocarbons from synthesis gas.

BACKGROUND OF THE INVENTION

The catalytic preparation of hydrocarbons from synthesis gas, i.e. a mixture of carbon monoxide and hydrogen, is well known in the art and is commonly referred to as Fischer-Tropsch synthesis.

Catalysts suitable for use in a Fischer-Tropsch synthesis process typically contain a catalytically active metal of Group VIII of the Periodic Table of the Elements (Handbook of Chemistry and Physics, 68th edition, CRC Press, 1987–1988) supported on a refractory oxide, such as alumina, titania, zirconia, silica or mixtures of such oxides. In particular, iron, nickel, cobalt and ruthenium are well known catalytically active metals for such catalysts. Reference may be made to EP-A-398420, EP-A-178008, EP-A-167215, EP-A-168894, EP-A-363537, EP-A-498976 and EP-A-71770.

There is a continuous interest in finding catalysts for use in the Fischer-Tropsch synthesis which provide an improved activity and an improved selectivity in the conversion of carbon monoxide into valuable hydrocarbons, in particular hydrocarbons containing 5 or more carbon atoms ("$C_5+$ hydrocarbons" hereinafter), and which minimise the formation of methane, which is a hydrocarbon carbon frequently considered as being of lower value.

U.S. Pat. No. 5,545,674 discuses the use of shell catalysts in the Fischer-Tropsch synthesis. These catalysts have the catalytically active metal positioned exclusively in a relatively thin outer layer of the catalyst particles. Compared with catalysts which have the catalytically active metal evenly dispersed throughout the catalyst particles, the shell catalysts have a short diffusion length and they are low in diffusion limitation, and therefore they show a relatively high selectivity with respect to the formation of $C_5+$ hydrocarbons, and they suppress the formation of methane.

Apart from Fischer-Tropsch synthesis processes, shell catalyst may be used in other chemical conversion processes, in particular where diffusion limitation plays a role.

For a high reaction rate or reactor productivity it is desirable to have a large quantity of the catalytically active metal in the outer layer of the shell catalyst particles. According to U.S. Pat. No. 5,545,674 and references cited therein, this can be achieved by repeated impregnation of a solution comprising the catalytically active metal into the carrier particles, using an immersion or a spraying method, with intermediate drying steps and calcination steps. Not only is this multi-step process cumbersome and time consuming, but by applying the (repetitive) impregnation method, some of the catalytically active metal may penetrate into layers of the catalyst particles which are deeper then desirable, in which case the shell catalyst adopts more of the characteristics of a catalyst which has the catalytically active metal dispersed evenly throughout the catalyst particles.

SUMMARY OF THE INVENTION

The present invention provides a method by which in a simple manner a shell metal catalyst can be made which has a large quantity of the catalytically active metal dispersed in the outer layer of the catalyst particles. Furthermore, the inner layers of the catalyst particles, i.e. where substantially no catalytically active metal is present and which will be designated hereinafter by the term "core", may be of a material which is different from the carrier which supports the catalytically active metal. This enables the skilled person to change bulk properties of the catalyst, without changing substantially its chemical properties. Such bulk properties may be the density, the heat conductivity and the strength. Even, hollow catalyst particles may be made, i.e. catalyst particles of which the core is a partially or completely empty space.

The present invention provides a process for preparing a shell metal catalyst or a precursor of a shell metal catalyst which process comprises the steps of (1) applying a slurry comprising a diluent, a catalytically active metal or a precursor compound thereof, and optionally a refractory oxide ("first refractory oxide" hereinafter) of an element having an atomic number of at least 20 or a precursor of the first refractory oxide, onto the surface of particles of a core carrier, forming a wet coating, and (2) removing at least a part of the diluent from the wet coating, wherein the slurry comprises at least 5% w of the catalytically active metal or the precursor compound thereof, calculated on the weight of the metal relative to the weight of calcination residue which can be formed from the slurry by drying the slurry and calcining.

The present invention also provides a shell metal catalyst or a precursor of a shell metal catalyst which is obtainable by the process of this invention, and to the use of the shell metal catalyst in a chemical conversion process.

The present invention further provides a process for producing hydrocarbons, which process comprises contacting a mixture of carbon monoxide and hydrogen with a shell metal catalyst according to this invention, wherein the catalytically active metal comprises a Group VIII metal which is present at least partly in metallic form.

DETAILED DESCRIPTION OF THE INVENTION

The core carrier which is used in step (1) of the process of this invention comprises preferably a material with a relatively low surface area, because the lower the surface area, the less will be the chance that the core carrier itself exhibits catalytic activity. Preferably, the core carrier has a BET surface area of less than 20 m$^2$/g, in particular less than 10 m$^2$/g. The BET surface areas as quoted herein are deemed to be based on BET surface area measurements according to ASTM D3663-92.

The core carrier comprises frequently an inorganic material, such as a refractory oxide ("second refractory oxide" hereinafter), a ceramic material, a metal or a carbon. Suitable second refractory oxides for use as the core carrier are silica, alumina, zirconia, magnesia and titania, and mixtures thereof. Silica and alumina are preferred.

The use of a core carrier which is of a metallic nature may be advantageous because it provides a shell catalyst which is strong and which has a relatively high heat conductivity. A relatively high heat conductivity is advantageous when the shell catalyst is used in a process where a substantial quantity of heat needs to be transferred from or to the reaction mixture, such as in a Fischer-Tropsch synthesis process. Strong and heat conductive catalysts are especially useful for application in a packed bed reactor, in particular a packed bed reactor designed and equipped for carrying out a Fischer-Tropsch synthesis. Suitable metals are aluminium, iron, copper, titanium and mixtures comprising one or more of these metals, like steel and brass. Because of their relatively low density, aluminium and mixtures comprising aluminium are preferred, for example mixtures which comprise at least 95% w aluminium. Such mixtures comprise frequently at most 99.9% w aluminium. Aluminium containing mixtures may comprise from 0.1 to 5% w of contaminants selected from, for example, magnesium, silicon and copper.

The core carrier may be partly or wholly of a carbon or of an organic material, such as a polymer or another resinous materials. Examples of suitable organic materials are polystyrenes, polyolefins, celluloses, hydrocarbon resins and epoxy resins. The carbon or the organic material may be removed in a later stage, for example during a calcination step as described hereinafter, in which case hollow catalyst particles are obtained or catalyst particles which have a core carrier of very low density. As a matter of definition, the removal of the core carrier is deemed to be a replacement of the core carrier by a core which is an empty space, and the resulting (partially) hollow catalyst particles are therefore deemed to be included within the term "shell catalyst".

The surface of the core carrier may be pre-treated to achieve a better adhesion of the coating to the core carrier, in particular after an optional calcination step as described hereinafter. The surface of the core carrier may be modified, e.g. by removing impurities or by covering the surface with a coating. Thus, the core carrier may be washed with water or diluted acid, such as aqueous phosphoric acid; or treated with a refractory oxide sol, such as a silica sol or an alumina sol, or a ceramic paint, such as a ceramic zirconium oxide paint. The second refractory oxide may be pre-treated by calcination, for example by heating at elevated temperature, preferably at a temperature between 400 and 750° C., more preferably between 450 and 650° C. The duration of the calcination is typically from 5 minutes to several hours, preferably from 15 minutes to 4 hours. Suitably, the calcination is carried out in an oxygen-containing atmosphere, preferably air.

The slurry comprises a diluent, as a continuous phase, and in the diluent a dispersed solid.

The skilled person will understand that the particles of the core carrier will be larger in size than the particles which constitute the dispersed solid. The latter particles may be the particles of a fine powder, whilst the particles of the core carrier may be a coarser material.

The volume average diameter of the particles of the dispersed phase is suitably from 0.0001 to 0.15 mm, preferably from 0.0002 to 0.1 mm, in particular from 0.0005 to 0.05 mm. The volume average diameters as specified in this patent document are invariably the volume average particle diameters as determined by using a MASTERSIZER MICRO PLUS instrument (trademark of Malvern Instruments, Ltd., United Kingdom; using the calculation method designated as "5THD" as supplied by Malvern Instruments Ltd.; the material to be measured is diluted with water to achieve the prescribed optical density and the volume average diameter is subsequently measured within 30 seconds).

The size of the particles of the core carrier are typically from 0.105 to 9.51 mm, more typically from 0.210 to 5.66 mm, determined by using standard US sieves (ASTM E11-61).

The shape of the core carrier particles will largely determine the shape of the shell metal catalyst particles which are to be prepared. Any shape may be applied which is suitable for application in a chemical process in which the shell metal catalyst may be used. Suitable shapes are for example spheres, cylinders and rings. It is also conceivable that suitable particles comprise a lumpy material without a well defined shape.

The diluent may be an organic diluent, such as a lower alcohol, a lower ketone, a lower ester, or a lower ether, for example ethanol, acetone, methyl ethyl ketone, ethyl acetate, diethyl ether or tetrahydrofuran. When the term "lower" is used herein in conjunction with an organic compound the term specifies that the organic compound has at most six carbon atoms, in particular four carbon atoms. More suitable diluents are aqueous diluents, such as a mixture of the organic diluent and water, preferably comprising at least 50% w of water and less than 50% w of the organic diluent, based on the total weight of the diluent. Most suitably, water is used as the single diluent.

The solids content of the slurry may differ widely. Preferably the solids content is in the range of from 0.5 to 90% w, more preferably from 1 to 80% w, relative to the weight of the slurry.

The dispersed solid may comprise for example the catalytically active metal or a precursor compound thereof, or it may comprise the first refractory oxide or a precursor thereof. If the dispersed solid comprises the catalytically active metal or a precursor compound thereof and no first refractory oxide or a precursor thereof is present, the shell metal catalyst or its precursor which is prepared in accordance with the invention may ultimately comprise the core carrier covered with a layer of the catalytically active metal or a precursor compound thereof.

It is however preferred that the shell metal catalyst or its precursor which is prepared in accordance with the invention comprises the core carrier covered with a layer which comprises the first refractory oxide supporting the catalytically active metal or a precursor compound thereof. This may be achieved by employing as the dispersed solid the first refractory oxide which supports the catalytically active metal or a precursor compound thereof. In this embodiment, the dispersed solid is preferably a supported catalyst or a precursor thereof which is obtainable by spray drying, optionally with subsequent calcination, as described in WO-99/34917. The same can also be achieved by employing the first refractory oxide or a precursor thereof as the dispersed solid and employing catalytically active metal or a precursor compound thereof as an additional dispersed solid and/or dissolved in the diluent. In the latter embodiment the slurry is preferably a slurry which can be made as described in WO-99/34917, designated in WO-99/34917 for use in the spray drying process.

The slurry comprises at least 5% w of the catalytically active metal or the precursor compound thereof, calculated on the weight of the metal relative to the weight of calcination residue which can be formed from the slurry by drying the slurry and calcining. In this context, the calcining is deemed to be carried out under standard conditions, by heating in air at 800° C. for 2 hours. In a preferred embodiment the slurry comprises at most 90% w, in particular in the range of from 10 to 60% w, of the catalytically active metal or the precursor compound thereof, on the same basis.

The slurry may be made separately from carrying out step (1). For example, the slurry may be made and subsequently applied onto the surface of the particles of the core carrier, by spraying or by immersing the particles in the slurry, or otherwise. In an alternative embodiment the slurry is made simultaneously with carrying out step (1), for example by wetting the particles of the core carrier with the diluent and subsequently contacting the wetted particles with solid in particulate form. During the said contacting the solid in particulate form is dispersed in the diluent, thus forming the slurry, with simultaneous formation of the wet coating. This contacting may be by sprinkling or dusting the solid onto the wetted particles or by tumbling or rolling the wetted particles in the solid.

When the slurry is made separately from carrying out step (1), the ingredients of the slurry may be mulled together, typically for a period of from 5 to 120 minutes, preferably from 15 to 90 minutes. The mulling process may be carried out over a broad range of temperatures, preferably from 15 to 90° C. The mulling process is conveniently carried out at ambient pressure. Any suitable, commercially available mulling machine may be employed.

It is preferred to include in the slurry one or more flow improving agents and/or peptising agents and burn-out materials. Such additives and their use are known in the art, cf. for example WO-99/34917.

A suitable method and apparatus for spraying the slurry onto the particles of the core carrier is known from Arntz et al., in "Preparation of Catalysts IV", B Delmon et al. (Eds.), Elsevier, 1987, p. 137 ff.

It is not necessary that the core carrier particles are completely covered by the wet coating. Suitably, at least 80% of the total surface available is covered, more suitably at least 90% is covered. Preferably the core carrier particles are completely covered.

The thickness of the wet coating is not material to this invention. Thus, the thickness of the wet coating may be chosen within wide ranges. The thickness of the wet coating is suitably such that after drying and calcining in accordance with the standard conditions as defined hereinbefore, the thickness of the remaining coating meets certain criteria. A first criterion may be that the largest thickness of the remaining coating is less than 0.2 mm, which means that there is no remaining coating which is thicker than 0.2 mm. In particular, the largest thickness is in the range of form 0.002 to 0.15 mm, more in particular in the range of from 0.005 to 0.1 mm. An independent second criterion may be that the average thickness of the remaining coating is in the range of from 0.001 to 0.15 mm, preferably in the range of from 0.002 to 0.1 mm, in particular in the range of from 0.005 to 0.08 mm. The average thickness as quoted is defined as the quotient of the total volume of the remaining coating (i.e. after drying and calcining in accordance with the said standard conditions) and the external surface area of the core particles. The average thickness so defined is deemed to relate to a relatively large number of particles, say for the particles present in a dumped bed of 1 $m^3$ volume.

In step (2) at least a part of the diluent is removed from the wet coating, which provides the core carrier particles covered with a dried coating. Suitably the diluent is removed to such an extent that the coating has more strength so that further handling of the particles is more easy. Preferably, the diluent is removed substantially completely, for example at least 80%, in particular at least 90% of the diluent is removed. The removal may accomplished by evaporating the diluent. The evaporation may be effected at an elevated temperature, for example above 30° C., preferably up to 400° C., more preferably up to 300° C. The period for evaporation is typically up to 5 hours, more preferably from 15 minutes to 3 hours.

It is preferred that the core carrier particles covered with the dried coating are subjected to a calcination step, i.e. subsequent to step (2). The calcination step increases the hardness and the strength of the coating and the adhesion of the coating to the core carrier. The calcination involves heating at elevated temperature, preferably at a temperature between 400 and 750° C., more preferably between 450 and 650° C. The duration of the calcination step is typically from 5 minutes to several hours, preferably from 15 minutes to 4 hours. Suitably, the calcination step is carried out in an oxygen-containing atmosphere, preferably air. It will be appreciated that, if desired, the step (2) and the calcination step may be combined.

According to this invention a shell catalyst is made which contains a catalytically active metal or a precursor compound of the catalytically active metal. Typically the metal is a Group VIII metal, as in many chemical reactions, such as Fischer-Tropsch synthesis and hydrogenations, a Group VIII metal catalyst may be used.

For use in the Fischer-Tropsch synthesis it is preferred that the Group VIII metal is selected from iron, nickel, cobalt and ruthenium. More preferably, cobalt or ruthenium is selected as the Group VIII metal, because cobalt based catalysts and ruthenium based catalysts give a relatively high yield of $C_5$+ hydrocarbons. Most preferably, cobalt is selected as the Group VIII metal. A further metal may be present in order to improve the activity of the catalyst or the selectivity of the conversion of synthesis gas into hydrocarbons. Suitable further metals may be selected from manganese, vanadium, zirconium, rhenium, platinum and scandium. A preferred further metal is manganese or vanadium, in particular manganese.

The atomic ratio of the Group VIII metal to the further metal, if present in the catalyst, is typically at least 5:1 and it is typically at most 200:1.

The further metal may be introduced in the same manner and together with the Group VIII metal. The catalytically active metal and, optionally, the further metal may be introduced in the form of a precursor compound. Such precursor compounds include salts, such as nitrates, carbonates or acetates, hydroxides and oxides, and the metal itself. Complex compounds are possible as well. The metal and/or their precursor compounds may or may not be soluble in the diluent, or they may be partially soluble in the diluent. Generally, calcination will effect that the precursor compounds of the metal will be converted into the corresponding metal oxide.

The first refractory oxide comprises an oxide of an element having an atomic number of at least 20. Examples of suitable refractory oxides include alumina, titania, zirconia or mixed oxides comprising alumina, titania or zirconia, such as silica-alumina or physical mixtures such as a mixture of titania and silica. Preferably, the first refractory oxide comprises titania, zirconia or mixtures thereof, in particular the refractory oxide comprises a titania.

According to a preferred embodiment, the first refractory oxide comprising titania, zirconia or mixtures thereof, may further comprise up to 50% w of another refractory oxide, typically silica or alumina, based on the total weight of the refractory oxide. More preferably, the other refractory oxide, if present, comprises up to 20% w, even more preferably up to 10% w, on the same basis.

The first refractory oxide most preferably consists of titania, in particular titania which has been prepared in the absence of sulphur-containing compounds. An example of such a preparation method involves flame hydrolysis of titanium tetrachloride.

It will be appreciated that the first refractory oxide may not be of the desired particle size and shape. Thus, a shaping step may be applied. Shaping techniques are well known to the skilled person and include spray-drying and milling methods.

The first refractory oxide is typically a material having a large surface area. For example, the surface area is at least 25 $m^2/g$, and more specially at least 35 $m^2/g$. Suitably the surface area is at most 400 $m^2/g$, especially at most 200 $m^2/g$. Preferably the surface area is in the range of from 40 $m^2/g$ to 100 $m^2/g$.

The precursor of the first refractory oxide is a compound which yields the first refractory oxide in a calcination step as described hereinbefore. The precursor of the first refractory oxide may be soluble in the diluent which is used in the process of this invention. The precursor of the first refractory oxide may be an organic salt or complex compound, in particular having up to 20 carbon atoms. Examples of such salts and complex compounds are salts, such as acetates, proprionates, citrates; chelates, such as acetylacetonates, alkyl acetoacetates and chelates with lactic acid; alcoholates, such as ethylates, aminoethylates and isopropylates; and alkyl compounds, such as ethyl and isooctyl compounds. Alternatively, the precursor of the refractory oxide is an inorganic compound, such as a hydroxide; or an inorganic salt, such as a halide.

For example, suitable precursors of titanium dioxide are tetraethyl titanate, isostearoyl titanate and octyleneglycol titanate and triethanolamine titanate. A very suitable compound, in particular for use in combination with water, is the ammonium salt of lactic acid chelated titanate. Such compounds are available from DUPONT under the trademark TYZOR.

It is not excluded that the shell metal catalyst comprises further components, in addition to those mentioned herein.

Now turning to a possible use of the shell metal catalyst or its precursor prepared in accordance with this invention, as indicated hereinbefore, the shell metal catalyst may be used in a process for the preparation of hydrocarbons from carbon monoxide and hydrogen. Typically, when in use in that process, the metal which is present on the shell metal catalyst is a Group VIII metal and, typically, at least part of the Group VIII metal is present in its metallic state.

Therefore, it is normally advantageous to activate the Group VIII metal catalyst prior to use by a reduction, in the presence of hydrogen at elevated temperature. Typically, the reduction involves treating the catalyst at a temperature in the range from 100 to 450° C., at elevated pressure, typically from 1 to 200 bar abs, frequently for 1 to 200 hours. Pure hydrogen may be used in the reduction, but it is usually preferred to apply a mixture of hydrogen and an inert gas, like nitrogen. The relative amount of hydrogen present in the mixture may range between 0.1 and 100% v.

According to a preferred embodiment of the reduction, the catalyst is brought to the desired temperature and pressure level in a nitrogen gas atmosphere. Subsequently, the catalyst is contacted with a gas mixture containing only a small amount of hydrogen gas, the rest being nitrogen gas. During the reduction, the relative amount of hydrogen gas in the gas mixture is gradually increased up to 50% v or even 100% v.

It may be preferred to activate the Group VIII metal catalyst in-situ, that is inside the reactor for the preparation of hydrocarbons from synthesis gas. For example, WO-97/17137 describes an in-situ catalyst activation process which comprises contacting the catalyst in the presence of hydrocarbon liquid with a hydrogen-containing gas at a hydrogen partial pressure of at least 15 bar abs., preferably at least 20 bar abs., more preferably at least 30 bar abs. Typically, in this process the hydrogen partial pressure is at most 200 bar abs.

The process for the preparation of hydrocarbons from synthesis gas is typically carried out at a temperature in the range of from 125 to 350° C., preferably from 175 to 275° C. The pressure is typically in the range of from 5 to 150 bar abs., preferably from 5 to 80 bar abs., in particular from 5 to 50 bar abs.

Hydrogen and carbon monoxide (synthesis gas) is typically fed to the process at a molar ratio in the range from 0.7 to 2.5. Low hydrogen to carbon monoxide molar ratios will increase the $C_5+$ selectivity of the catalysts, i.e. the selectivity of the formation of $C_5+$ hydrocarbons.

However, in the embodiment of the invention in which the Group VIII metal is cobalt and the further metal is manganese and/or vanadium, which are present in an atomic ratio of cobalt/(manganese+vanadium) of at least 12:1, the $C_5+$ selectivity of the catalyst is remarkably high, even when using synthesis gas having a high hydrogen to carbon monoxide atomic ratio. In this embodiment the hydrogen to carbon monoxide molar ratio in the range of from 1.5 to 2.5 may be used.

The gas hourly space velocity ("GHSV" hereinafter) may vary within wide ranges and is typically in the range from 400 to 20000 Nl/l/h, preferably from 500 to 10000 Nl/l/h.

The term "GHSV" is well known in the art, and relates to the gas per hour space velocity, i.e. the volume of synthesis gas in Nl (i.e. at the standard temperature of 0° C. and the standard pressure of 1 bar (100,000 Pa)) which is contacted in one hour with one litre of catalyst particles, i.e. excluding interparticular void spaces. In the case of a fixed bed catalyst, the GHSV is usually expressed as per litre of catalyst bed, i.e. including interparticular void space. In that case a GHSV of 1600 Nl/l/h on catalyst particles corresponds to about 1000 Nl/l/h on catalyst bed.

The process for the preparation of hydrocarbons may be conducted using a variety of reactor types and reaction regimes, for example a fixed bed regime, a slurry phase regime or an ebulliating bed regime. A fixed bed regime is preferred. It will be appreciated that the size and the shape of the shell catalyst particles may vary depending on the reaction regime they are intended for. It belongs to the skill of the skilled person to select the most appropriate size and shape for a given reaction regime.

Further, it will be understood that the skilled person is capable to select the most appropriate conditions for a specific reactor configuration, the reaction regime and a work-up scheme. For example, the preferred gas hourly space velocity may depend upon the type of reaction regime that is being applied. Thus, if it is desired to operate the hydrocarbon synthesis process with a fixed bed regime, preferably the gas hourly space velocity is chosen in the range from 500 to 2500 Nl/l/h. If it is desired to operate the hydrocarbon synthesis process with a slurry phase regime, preferably the gas hourly space velocity is chosen in the range from 1500 to 7500 Nl/l/h.

The invention will now be illustrated further by means of the following Examples.

EXAMPLE I

A precursor of a shell metal catalyst was prepared as follows.

A paste was prepared by mixing and kneading together commercially available titania powder (P25 ex. Degussa, BET surface area 50 m$^2$/g (ASTM D3663-92)), commercially available co-precipitated cobalt/manganese hydroxide and water. The mixture contained 20.1% w cobalt and 1.6% w manganese, calculated as the weight of elemental cobalt and manganese, relative to the weight of a calcination residue which can be formed by drying and calcining the paste in air at 800° C. for 2 hours. The paste was dried and ground to obtain a fine powder.

Silica granules were calcined in air at 550° C. for 2 hours. A sieve fraction of 0.841–1.19 mm (standard US sieves, ASTM E11-61) was wetted with water just sufficiently to fill the pores with water. The wetted silica granules were tumbled and sprayed simultaneously during 5 minutes with water and with the fine powder, to form a coating on the silica granules. The coated silica granules were separated from the remaining powder by sieving, dried at 120° C. for 2 hours and subsequently calcined in air at 550° C. for 2 hours. A sieve fraction of the coated and calcined silica granules (1.00–1.19 mm, standard US sieves, ASTM E11-61) was separated and used for further testing. The average thickness of the coating after the calcination was 80 μm.

EXAMPLE II

A precursor of a shell metal catalyst was prepared as follows.

Aluminium particles (typical dimensions 0.1–4 mm) were washed with 25% w aqueous phosphoric acid, and coated with a commercially available ceramic zirconium oxide paint (obtained from ZYP Coatings, type ZO). Subsequently, an aqueous slurry comprising finely dispersed commercially available cobalt hydroxide and a commercially available ammonium zirconium carbonate (MEL Chemicals, available under the trademark BACOTE 20) was spray coated onto the aluminium particles. The slurry comprised 67% w cobalt, calculated as the weight of cobalt metal, relative to the weight of a calcination residue which can be formed by drying and calcining the slurry in air at 800° C. for 2 hours. The spray-coated particles were dried at 120° C. for 2 hours and subsequently calcined in air at 500° C. for 2 hours. The average thickness of the coating after the calcination was 20 μm.

EXAMPLE III

A precursor of a shell metal catalyst was prepared as follows.

A slurry was prepared by mixing and milling together commercially available titania powder (P25 ex. Degussa, BET surface area 50 m$^2$/g (ASTM D3663-92)), commercially available co-precipitated cobalt/manganese hydroxide, commercially available lactic acid titanate ammonium salt (ex Dupont, available under the trademark TYZOR LA), a commercially available ceramic zirconium oxide paint (obtained from ZYP Coatings, type ZO) and water. The slurry contained 16% w cobalt and 1.0% w manganese, calculated as the weight of elemental cobalt and manganese, relative to the weight of the calcination residue which can be formed by drying and calcining the slurry in air at 800° C. for 2 hours. The average particle diameter of the solids present in the slurry was less than 0.28 μm.

Aluminium shavings (typical dimensions 4 mm by 1 mm by 0.1 mm) were washed with 25% w aqueous phosphoric acid, and heated in air at 600° C. for 4 hours. The slurry was spray-coated onto the treated aluminium shavings. The spray-coated shavings were dried at 120° C. for 2 hours and subsequently calcined in air at 500° C. for 2 hours. The average thickness of the coating after the calcination was 34 μm.

EXAMPLE IV

The precursor shell metal catalysts prepared in Examples I and II were converted into active Fisher-Tropsch catalysts by reduction, and subsequently applied in a Fisher-Tropsch synthesis as follows.

A micro-flow reactor containing the catalyst precursor particles in the form of a fixed bed was heated to a temperature of 280° C., and pressurised with a continuous flow of nitrogen gas to a pressure of 1 bar abs. The catalyst precursor was reduced in-situ for 24 hours with a mixture of nitrogen and hydrogen gas. During reduction the relative amount of hydrogen in the mixture was gradually increased from 0% v to 100% v. The water concentration in the off-gas was kept below 3000 ppmv.

Following reduction, the preparation of hydrocarbons was carried out with a mixture of hydrogen and carbon monoxide at a H$_2$/CO ratio of 1.1:1 and a pressure of 32 bar abs. The GHSV and the reaction temperature, expressed as the weighted average bed temperature are set out in Table I. The space time yield, expressed as grammes hydrocarbon product per litre catalyst particles (including the voids between the particles) per hour; the selectivity of methane, expressed in % w of the total hydrocarbon product; the selectivity to hydrocarbons containing 5 or more carbon atoms (C$_5$+ selectivity), expressed as % w of the total hydrocarbon product; and the selectivity of carbon dioxide, expressed in % w of the total hydrocarbon product; were determined after 40 hours of operation. The results are also set out in Table I.

TABLE I

| Example | I | II | III |
|---|---|---|---|
| Temperature, ° C. | 230 | 213 | 237 |
| GHSV, Nl/(l · h) | 1188 | 795 | 800 |
| Space time yield, g/(l · h) | 138 | 92 | 86 |
| Selectivity CH$_4$, % w | 5.8 | 6.2 | 5.7 |
| C$_5$+ selectivity, % w | 86.5 | 84 | 88 |
| Selectivity CO$_2$, % w | 1.5 | 2.0 | 1.8 |

We claim:

1. A process for preparing a shell metal catalyst or a precursor of a shell metal catalyst, which comprises the steps of:

(1) applying a slurry comprising a diluent, cobalt or a precursor compound thereof, and optionally a first refractory oxide of an element selected from the group consisting of those having an atomic number of at least 20 and at most 92 or a precursor of the first refractory oxide thereof, onto the surface of particles of a core carrier, forming a wet coating, wherein the slurry comprises at least 5 wt. % of the cobalt or the precursor compound thereof, calculated based on the weight of the metal relative to the weight of a calcination residue which is formed from the slurry by drying and calcining, and (2) removing at least a part of the diluent from the wet coating to form a dried coating on the core carrier.

2. The process of claim 1, wherein the diluent is water.

3. The process of claim 1, wherein the solids content of the slurry is in the range of from 0.5 to 90 wt. %, relative to the weight of the slurry.

4. The process of claim 1, wherein the slurry comprises at most 90 wt. % of the cobalt or the precursor compound thereof, calculated based on the weight of the metal relative to the weight of calcination residue which is formed from the slurry by drying and calcining.

5. The process of claim 1, wherein the slurry comprises the first refractory oxide, or a precursor thereof, as a dispersed solid, and the cobalt or the precursor compound thereof, as an additional dispersed solid and/or dissolved in the diluent.

6. The process of claim 1, wherein the applying comprises spraying.

7. A shell metal catalyst or a precursor of a shell metal catalyst, which is prepared by a process comprising the steps of:
   (1) applying a slurry comprising a diluent, cobalt or a precursor compound thereof, and optionally a first refractory oxide of an element selected from the group consisting of those having an atomic number of at least 20 and at most 92 or a precursor of the first refractory oxide thereof, onto the surface of particles of a core carrier, forming a wet coating, wherein the slurry comprises at least 5 wt. % of the cobalt or the precursor compound thereof, calculated based on the weight of the metal relative to the weight of a calcination residue which is formed from the slurry by drying and calcining, and
   (2) removing at least a part of the diluent from the wet coating to form a dried coating on the core carrier.

8. The shell metal catalyst or a precursor of a shell metal catalyst of claim 7, wherein the core carrier comprises a second refractory oxide or a metal.

9. The shell metal catalyst or a precursor of a shell metal catalyst of claim 7, wherein the first refractory oxide comprises titania, zirconia or mixture thereof.

10. The shell metal catalyst or a precursor of a shell metal catalyst of claim 7, wherein the applying comprises spraying.

11. A process for producing hydrocarbons, wherein said process comprises contacting a mixture of carbon monoxide and hydrogen with a shell metal catalyst or a precursor of a shell metal catalyst, which is prepared by a process comprising the steps of:
   (1) applying a slurry comprising a diluent, cobalt or a precursor compound thereof, and optionally a first refractory oxide of an element selected from the group consisting of those having an atomic number of at least 20 and at most 92 or a precursor of the first refractory oxide thereof, onto the surface of particles of a core carrier, forming a wet coating, wherein the slurry comprises at least 5 wt. % of the cobalt or the precursor compound thereof, calculated based on the weight of the metal relative to the weight of a calcination residue which is formed from the slurry by drying and calcining, and
   (2) removing at least a part of the diluent from the wet coating to form a dried coating on the core carrier.

12. The process of claim 11, wherein the applying comprises spraying.

* * * * *